United States Patent [19]

Bower et al.

[11] 4,147,063
[45] Apr. 3, 1979

[54] TWO AXIS GAS DAMPED ANGULAR VELOCITY SENSOR

[75] Inventors: Gerald S. Bower, Templeton; Rex B. Peters, Martinez; Harold D. Morris, Orinda, all of Calif.

[73] Assignee: Systron-Donner Corporation, Concord, Calif.

[21] Appl. No.: 836,159

[22] Filed: Sep. 23, 1977

[51] Int. Cl.² ............................................. G01P 9/02
[52] U.S. Cl. ...................................... 73/504; 73/505; 74/5 F
[58] Field of Search ................... 73/504, 505; 74/5 F, 74/5.5, 5.6

[56] References Cited

U.S. PATENT DOCUMENTS

| | | | |
|---|---|---|---|
| 3,077,785 | 2/1963 | Stiles | 74/5 |
| 3,463,016 | 8/1969 | Erdley | 74/5.6 |
| 3,610,051 | 10/1971 | Siff et al. | 74/5 |
| 3,974,701 | 8/1976 | Erdley | 73/504 |
| 3,987,555 | 10/1976 | Haagens | 74/5 |

*Primary Examiner*—Herbert Goldstein
*Attorney, Agent, or Firm*—Flehr, Hohbach, Test, Albritton & Herbert

[57] ABSTRACT

A thin plate-like rotor is mounted on a hub which in turn is attached to the shaft of a motor which drives the rotor at a predetermined rotational speed about a spin axes. A framework is provided for mounting the motor. The rotor has a damping face and an opposite signal face. A damping plate is mounted on the hub in close spaced relation with the damping face. A spring member is disposed between the hub and the rotor so that the rotor is free to move in restrained rotational fashion about one diameter of the rotor. Surrounding air is pumped through the space between the damping face and the damping plate to provide damping of the motion of the rotor about the one diameter. Pickoffs are mounted in the framework in close spaced relation to the signal face of the rotor. The pickoffs provide output indicative of the spacing between the signal face and the pickoffs which corresponds to angular velocity inputs about the separate axes disposed orthogonally with the spin axes.

11 Claims, 12 Drawing Figures

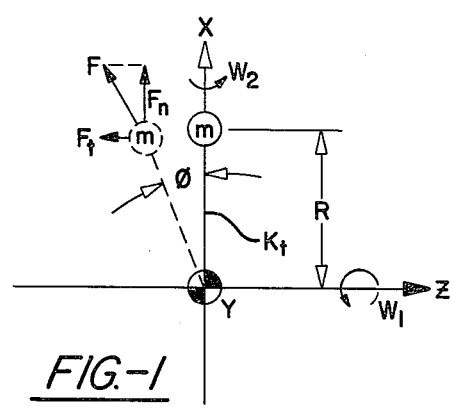
FIG.-1
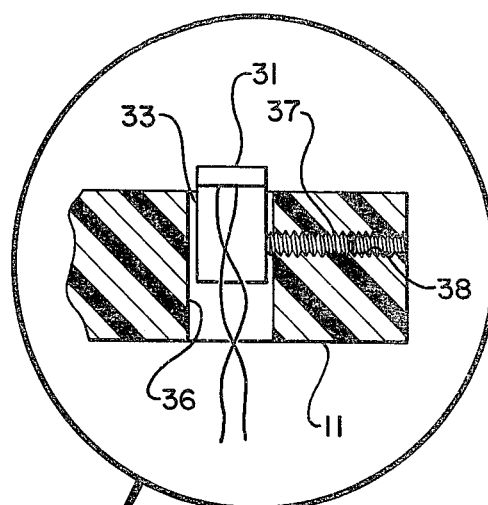
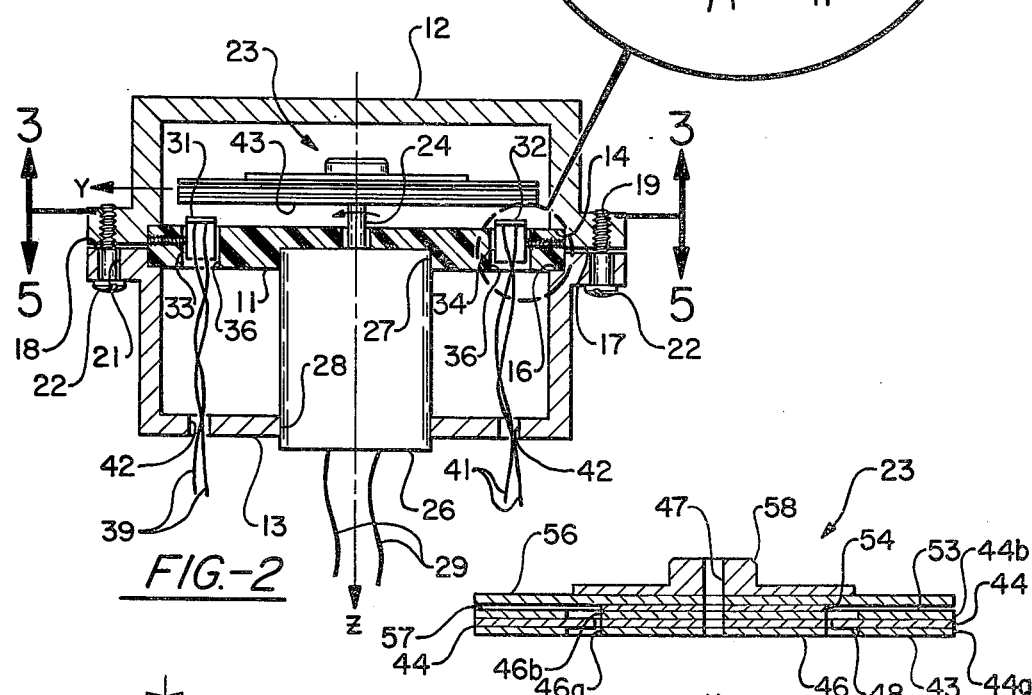
FIG.-2
FIG.-4
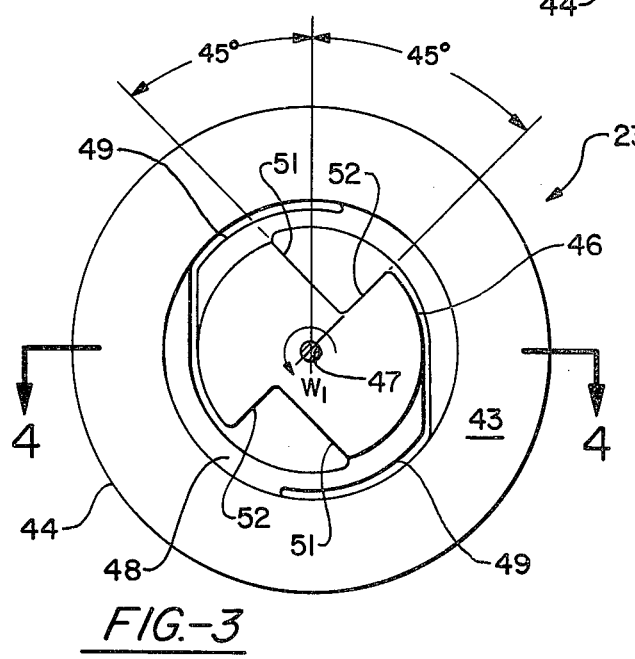
FIG.-3
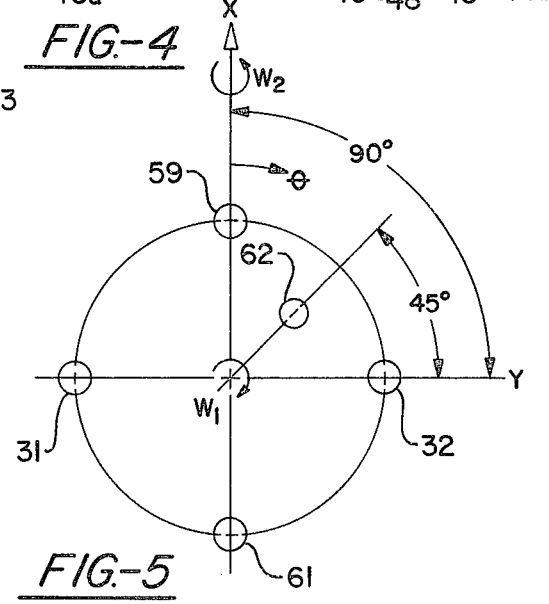
FIG.-5

TWO AXIS GAS DAMPED ANGULAR VELOCITY SENSOR

BACKGROUND OF THE INVENTION

This invention relates to an instrument for sensing angular velocity about two non-parallel axes, and more particularly to an improved angular velocity sensor having a gas damped inertial element.

Two axis angular rate of turn devices are known which utilize one spinning gyroscopic element having a spin axis which is caused to move away from a neutral orientation by precessional torque resulting from angular rate inputs about either of two orthogonal input axes. Some means of restraining the precession of the gyroscopic element is employed, such as a linear spring, so that the degree of precession may be sensed to thereby provide a signal corresponding to the angular velocity about each of the two input axes. Attempts in the past to obtain such dual axes angular velocity sensors have resulted in highly complex structure and highly sophisticated technology resulting in considerable cost figures. One such sensor utilizes a rotating shaft and rotor flexure suspension that may be visualized as a "ball and socket" joint between the shaft case and rotor. The flexure suspension has radial and axial rigidity, but low compliance for bending about axes normal to the spin axis. Such an instrument is described in conjunction with FIG. 2 in Control Engineering, Page 54 through 58, "Reviewing the Status of Inertial Sensors," March, 1971.

Another type of flexure supported gyroscope has only a single degree of freedom flexure between the rotating structure and the rotational drive shaft. Two axes of angular velocity are measured by measuring case to rotor displacement at orthogonal positions on the case. Such a sensor is described in conjunction with FIG. 3 of the Control Engineering article above. A two axis rate gyro is described in U.S. Pat. No. 3,176,523 to Amlie which has a static spring with radial and axial rigidity and low compliance for bending to allow restrained rotation of a gyroscopic element due to precessional torque, U.S. Pat. No. 3,559,492 to Erdley describes a two axis angular rate sensor having a rotating assembly including a multiplicity of peripheral vibrating elements mounted on radial torsion springs, whereby individual ones of the peripheral elements vibrate torsionally independent of the others.

The assignee of the invention disclosed herein also owns an invention wherein the inertial element is a thin plate-like rotor having the capability of bending about any axis and providing a spring rate restraining such bending when imposed on the rotor by precessional torque. An improved two axis angular velocity sensor is needed having relatively simple constructional features, low spring restraint providing strong structural support, easily obtained damping so that performance approaches that of a linear second order system, and two axis output signal discrimination.

SUMMARY AND OBJECTS OF THE INVENTION

In general, the device disclosed herein is a multi-axis angular velocity sensor having a framework supporting a rotor mounted therein. The rotor is free to rotate about a spin axis relative to the framework. A motor is mounted within the framework and provides a drive torque about the spin axis. A hub couples the rotor with the drive torque. The rotor has an annular disc-like shape with a damping face on one side and a signal or pickoff face on the other side. A spring-like support is disposed between the rotor and the hub which allows pivoting motion of the rotor about one diameter relative to the framework. A damping plate is also attached to the hub positioned proximate to and spaced axially from the damping face so that a damping gap is formed between the damping plate and the rotor. Spinning action of the rotor pumps surrounding air through the damping gap thereby providing damping of the pivoting motion of the rotor about the one diameter. A circuit is connected to the motor to control the drive torque produced thereby so that a constant rotational speed is obtained in the rotor. Pickoffs are provided in the framework having predetermined angular separation about the spin axis and being in spaced proximate relation with the signal or pickoff face of the rotor. The pickoffs provide output signals which are indicative of the spacing between the pickoffs and the rotor signal face. Consequently, angular velocity of the framework about axes disposed orthogonally to the spin axis results in indication thereof in the output signals when the axes are oriented at the predetermined angular separation between the pickoffs.

It is an object of the present invention to provide a subminiature dual axis rate sensor of simple construction and providing improved angular rate sensing.

Another object of the present invention is to provide a subminiature dual axis rate sensor having predetermined damping for providing predetermined linear second order response characteristics.

Another object of the present invention is to provide a subminiature dual axis rate sensor in which motor speed is controlled to provide torque corresponding to load and consequent constant inertial element rotational speed.

Another object of the present invention is to provide a subminiature dual axis rate sensor having distinct outputs relatively free of rotor induced and acceleration induced noise.

Additional objects and features of the invention will appear from the following description in which the preferred embodiment has been set forth in detail in conjunction with the accompanying drawings.

BRIEF DESCRIPTION OF THE DRAWINGS

FIG. 1 is a mechanical force diagram relating to the disclosed dual axis rate gyro.

FIG. 2 is a sectional side elevation view of the disclosed dual axis rate sensor.

FIG. 3 is a partial front elevation view along the line 3—3 of FIG. 2.

FIG. 4 is a sectional view along the line 4—4 of FIG. 3.

FIG. 5 is a front elevation view along the line 5—5 of FIG. 2.

DESCRIPTION OF THE PREFERRED EMBODIMENT

Figure 7:
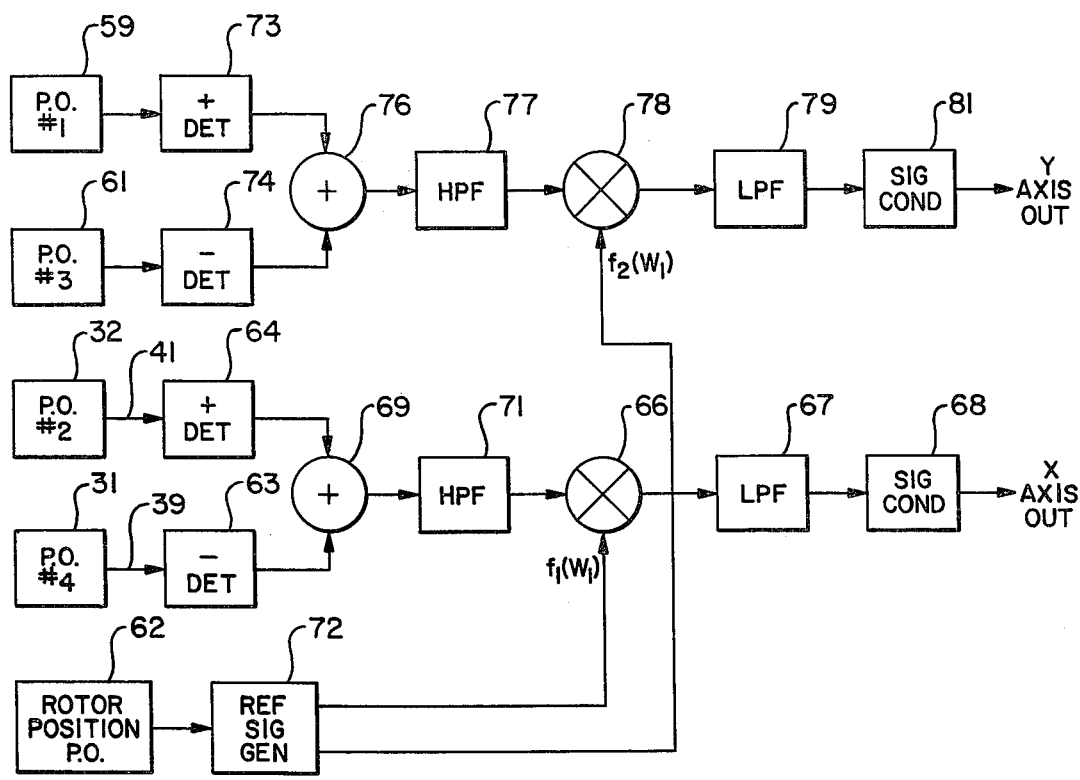
FIG. 7 is a block diagram of the dual axis rate sensor.

It may be shown that the natural frequency of a thin disc about one diameter of the disc with relatively insignificant spring restraint about the one diameter is equivalent to the frequency of rotation about a spin axis oriented orthogonally to the one diameter. The foregoing presumes that the thin rotating disc or plate has its mass substantially in the plane of rotation that the mechanical system behaves substantially as a linear second order system, and that system excitation forces or torques are sinusoidal. The foregoing may be seen to be valid by reference to FIG. 1 of the drawings and the following relationships in terms of the symbols contained in FIG. 1.

$$F = a_n m = \omega_1^2 R m$$

$$F_n = \omega_1^2 R m \cos\phi$$

$$J_z = mR^2$$

$$F_t = \omega_1^2 R m \sin\phi \approx \omega_1^2 R m \phi$$

$$T = F_t R = \omega_1^2 R^2 m \phi$$

$$k_t = T/\phi = \omega_1^2 R^2 m$$

$$\omega_n = \sqrt{k_t/J_z} = \sqrt{\omega_1^2 R^2 m / mR^2} = \omega_1$$

The situation of a thin disc-like annular rotor is much the same as the configuration depicted in Fig. 1 where the rotor mass is substantially in the plane of rotation. In such a case there is freedom for a rotor periphery to move rotationally about the Y axes of FIG. 1. A natural frequency of rotation for the rotor periphery about the one diameter would be $\omega_1$, the rotational frequency of the rotor periphery about the Z axis.

However, the foregoing must be modified by the consideration that a linear second order system with damping which is excited at the natural frequency will exhibit a phase shift of 90° relative to the excitation. Consequently, the displacement or rotation of the thin annular disc-like rotor represented by the angle $\phi$ will take place at a rotational position 90° displaced about the Z axes from that shown in FIG. 1. Thus, the one diameter at the position of maximum deflection of the thin annular disc-like rotor will, in theory, be aligned with the X axis. The significance of the foregoing will be discussed in the disclosure of the structure for support and orientation of the signal generators or pickoffs hereinafter.

Turning now to FIG. 2 in the drawings, a sectional view of the two axis angular rate sensor is shown with a framework member 11 mounted inside a split housing having a rotor end cover 12 and a motor end cover 13. Framework 11 is disposed within internal peripheral grooves 14 and 16 in rotor and motor end covers 12 and 13 respectively. Opposing faces 17 and 18 on rotor and motor end covers 12 and 13 respectively are spaced apart when the faces of the internal peripheral grooves 14 and 16 rest against opposite faces of framework member 11. A plurality of threaded holes 19 are formed in the flange-like portion of rotor end cover 12 and a matching pattern of through holes 21 is formed in the flange-like portion of rotor end cover 13. A plurality of fasteners such as screws 22 pass through holes 21 to engage the threads in threaded holes 19, thereby drawing rotor and motor end covers 12 and 13 together, placing pressure against the opposite faces of framework 11. In this fashion framework 11 is held in place within rotor and motor end covers 12 and 13.

A rotor assembly is shown generally at 23 coupled to a shaft 24 extending from and driven by a motor 26. Motor 26 has one end engaged and held in a counterbore 27 in framework 11, and the other end engaged and held in an opening 28 in the end of motor end cover 13. A pair of power leads 29 are shown exiting from the accessible end of motor 26.

A pair of pickoff coils 31 and 32 are shown mounted on a respective pair of pickoff coil mounting blocks 33 and 34. Each of mounting blocks 33 and 34 are inserted in through bores 36 formed in framework 11 on opposite sides of the axis of shaft 24. The axis of shaft 24 is designated as the spin axis, Z, about which rotor assembly 23 is driven rotationally by motor 26. Pickoff mounting blocks 33 and 34 are retained in bores 36 by means of a set screw 37 engaging the threads in a threaded bore 38 extending through the periphery of framework 11 to intersect bores 36. Pickoff coils 31 and 32 have signal leads 39 and 41 respectively extending therefrom through access means such as apertures 42 in motor end cover 13. Pickoff coils 31 and 32 are shown spaced from a signal generator or pickoff face 43 on rotor assembly 23.

FIG. 3 shows pickoff face 43 on rotor assembly 23. Pickoff face 43 is on an annular disc shaped rotor 44. Rotor assembly 23 has a centrally located hub 46 having a bore 47 therein for receiving and attaching to rotor shaft 24. A spring member 48 extends between hub 46 and disc shaped rotor 44. Spring member 48 has flat flexural spring sections 49 located on opposite sides of the central axis of rotor assembly 23. Annular disc shaped rotor 44 may be seen to be free to rotate in spring restrained fashion about the vertical axes relative to hub 46 in FIG. 3 of the drawings as flat flexural spring sections 49 deflect in a bending mode.

Hub 46 is seen to have two openings therethrough formed by orthogonally intersecting edges 51 and 52. Thus, in this embodiment, intersecting edges 51 and 52 are seen to be displaced angularly not only 90° apart, but in 45° angular separation each from the one diametral axis allowing freedom of motion of angular disc shaped rotor 44 relative to hub 46.

FIG. 4 shows rotor assembly 23 in section with annular disc shaped rotor 44 fabricated of two annular discs 44a and 44b positioned on opposite sides of a peripheral portion of spring member 48. Pickoff face 43 is shown on the exposed face of disc shaped rotor element 44a and a damping face 53 is shown on the exposed face of disc shaped rotor element 44b. Hub 46 is also fabricated of hub elements 46a and 46b disposed on opposite sides of a central portion of spring member 48. A damping spacer 54 is shown adjacent one side of hub 46, serving to space a damping plate 56 from damping face 53, thereby forming a damping gap 57 therebetween. A hub support member 58 is attached to the outward facing surface of damping plate 56, and bore 47 is shown passing centrally through the entire stacked assembly of elements in rotor assembly 23.

Adjacent surfaces in the stacked rotor assembly 23 are bonded together by means of an appropriate adhesive. It should be noted that hub element 46a is fabricated from the same piece of thin sheet stock material as disc shaped rotor element 44a. In like manner hub element 46b is formed from the same sheet of thin sheet stock as is disc shaped rotor element 44b. Since spring member 48 is a continuous member, in this embodiment, from the center to the periphery of the rotor assembly 23, the thickness of hub 46 and annular disc shaped rotor 44 must be substantially the same. Consequently damping gap 57 may be precisely determined by selecting a predetermined thickness of damping spacer 54. Since, as previously described herein, the natural frequency of annular disc shaped rotor 44 about the one diametral axes of freedom through the flat flexural spring sections 49 is substantially the same as the rotational frequency of disc shaped rotor 44 about the motor/rotor spin axes Z, the scale factor of the two axis rate sensor is dependent upon the damping constant. The scale factor is a function of the ratio of the rotor moment of inertia about the one diametral axes of freedom therethrough to the damping constant. Thus, a judicious selection of damping constant will provide a predetermined amplitude response or scale factor while maintaining the same substantially 90° phase lag of rotor response relative to angular velocity inputs. This has considerable importance when considering that the location about the spin axes Z is important so that maximum signal is obtained. Maximum signal is afforded when maximum displacements are obtained between the pickoff coils and the pickoff face of annular rotor 44 for an input angular velocity about a predetermined input axes.

Turning to FIG. 5 the location of the various pickoff coils in framework 11 is shown. Pickoff coils 31 and 32 are shown in the positions they occupy in FIG. 2 above. In the instance where two predetermined input axes about which angular velocities are to be measured are selected to be at 90° separation about spin axes Z, a second pair of pickoff coils 59 and 61 will be placed as shown in FIG. 5. Pickoff coils 59 and 61 are mounted in the framework 11 spaced from pickoff face 43 on rotor assembly 23 similar to the manner in which pickoff coils 31 and 32 are mounted. A rotor position pickoff coil 62 is located in angular position 45° from axes through pickoffs 31/32 and 59/61. The four pickoff coils 59/61 and 31/32 are spaced from the pickoff face 43 during initial assembly by positioning rotor assembly 23 axially on motor shaft 24 and thereafter fixing rotor assembly 23 to shaft 24 by means of a set screw (not shown) or some alternate means such as an appropriate adhesive. Rotor position pickoff 62 is spaced from the face of hub 46 at the same time. Fine spacing of the pickoff coils 31/32 and 59/61 from pickoff face 43 is obtained by axially positioning pickoff mounting blocks 33/34 and similar mounting blocks on which pickoff coils 59/61 are mounted within mounting bores 36. Set screws 37 are brought to bear against the individual pickoff mounting blocks to retain proper pickoff coil positioning once adjusted. Rotor position pickoff coil 62 is finely adjusted in spaced relation with the adjacent face of rotor hub 46 in a similar fashion. Rotor position pickoff coil 62 is located at a radius from spin axes Z such that intersecting edges 51 and 52 pass by the face thereof. The output from rotor position pickoff coil 62 approximates a square wave output of twice the rotor frequency in this embodiment as hub 46 and the openings therein pass the face of pickoff 62 in sequence during rotor rotation.

As stated above, in theory when an angular velocity input occurs about the X axis, seen as $\omega_2$ in FIG. 5, and rotor 44 is spinning about the spin axis Z, the annular disc shaped rotor 44 will tend to turn about an axle extending along the one diameter of rotor 44 through flat flexural spring sections 49 which are used in this embodiment. It is envisioned that other means of supporting an angular rotor 44 on hub 46 for rotation about one diameter are included within the scope of this disclosure; i.e. radially extending torsion springs, low friction pivots, etc. At first it would be suspected that for an input about the X axis rotor 44 would be "uncaged" so that it could turn about the axle through spring sections 49 while the axle was aligned with the Y axis. As explained above for linear second order systems and sinusoidal inputs rotor displacement about the axle or one diameter of rotor 44 occurs 90° later with the axle aligned with the X axis. Therefore, in theory, the pickoffs 31 and 32 would be in position to sense the greatest variation in spacing from an undisturbed position between pickoff face 43 and the pickoffs for angular velocity inputs about the X axis. However, in actual practice it is seen that the angle of lag from the X axis at which pickoff face 43 is at maximum variation from the undisturbed spacing from coils 31 and 32 is not precisely 90° past the X axis. Consequently, the entire pickoff coil pattern may be rotated relative to a predetermined input axis through rotor and motor end covers 12 and 13 so that the pickoffs are positioned at the angle positive to input axis X where maximum spacing variation will be seen between pickoff coils 31 and 32 and pickoff face 43. The foregoing discussion holds equally well for an input about the Y axis of FIG. 5, wherein signal indicative thereof is produced by pickoff coils 59 and 61. An alternative method for obtaining the foregoing maximized signal output for angular velocity inputs would be to test the instruments for such maximum signal output for given angular velocity inputs, and thereafter mark the sensitive axes on the exterior of the rotor and motor end covers 12 and 13 respectively, or whatever external structure is available. In this fashion the sensitive axis would be identified for future mounting use. It should also be clear that from the configuration of hub 46 and location of rotor position pickoff coil 62 that an output indicative or rotor position is produced which is somewhat square wave in shape, is 90° (electrical) lagging the outputs from pickoff coils 31/32, and is 90° (electrical) leading the outputs from pickoff coils 59/61. As is hereinafter described these phase relationships may be altered for the convenience of signal conditioning circuitry.

Figure 6:
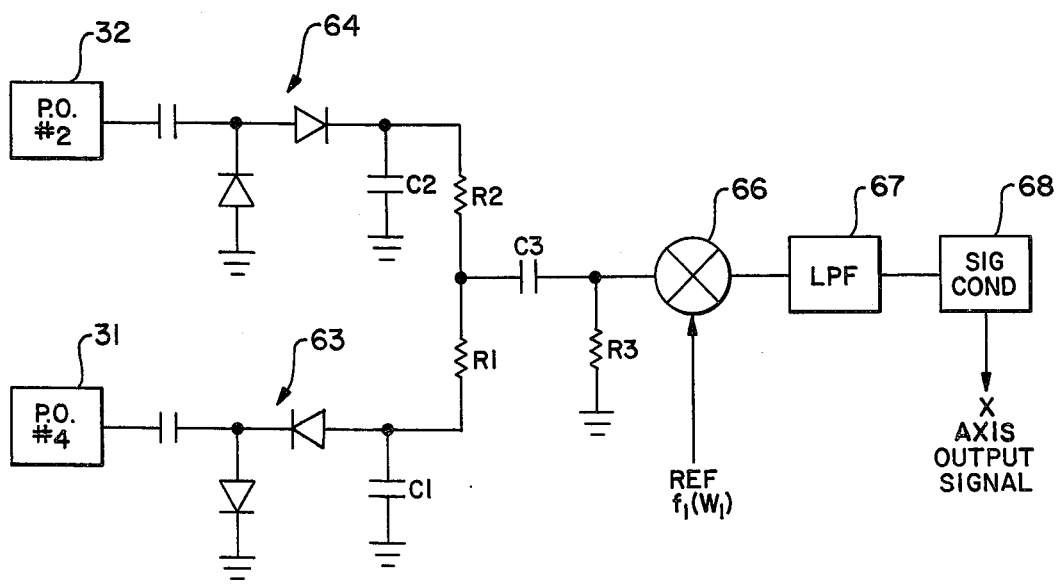
FIG. 6 is a schematic diagram of the signal channel for one sensing axis in the dual axis rate sensor.

The electrical schematic of FIG. 6 shows a pair of pickoff coils corresponding to coils 31 and 32 in FIG. 2 and 5. The pickoff coils may be of the type described in U.S. Pat. No. 3,321,753. As recited above, pickoffs 31 and 32 provide output signal indicative of the spacing between the coils and pickoff face 43 which output signals are coupled to detectors 63 and 64 respectively. Detectors 63 and 64 are configured so that the outputs are of opposite sign, are each smoothed by capacitors C1 and C2 respectively to remove the pickoff excitation frequency, and are subsequently summed in the summing resistance network of R1 and R2. A high pass filter consisting of capacitor C3 and resistor R3 is used to block DC error signals and to couple the output from the summing resistances R1 and R2 to a multiplier or mixer 66. A reference frequency input is provided to mixer 66 which is a function of the spin frequency $\omega_1$. The output of multiplier 66 is coupled to a low pass filter 67 which in turn produces a signal output coupled to a signal conditioner 68 for providing an output indicative of angular velocity input about the X axis of FIG. 5. It should be noted that the two signal channels for the X axis may be as described in U.S. Pat. No. 3,967,064. The manner in which the signal indicative of angular velocity input about the Y axis of FIG. 5 is produced is similar to that recited above for the X axis.

FIG. 7 is a block diagram showing the four pickoff coils spaced from pickoff face 43 on annular disc shaped rotor 44 together with rotor position pickoff coil 62 all producing output signals. The output is as described above wherein a summing means 69 represents the summing resistance network of R1 and R2 in FIG. 6. Means for blocking DC signal errors such as high pass filter 71 is coupled to receive the output from summing network 69, and provides a high pass band as one input to mixer 66. The output from rotor position pickoff 62 is coupled to a reference signal generator 72 producing a pair of outputs $f_1(\omega_1)$ and $f_2(\omega_1)$. $f_1(\omega_1)$ is connected to mixer 66 as described above.

The signal channels for the Y axis output are similar to that for the X axis wherein pickoff coils 59 and 61 are coupled to detectors 73 and 74 respectively, which provide a non-inverted and an inverted detected signal which are summed in an additional summing network 76. An additional high pass filter 77 is provided for blocking DC error signals which provides a high pass band as an output to an additional mixer 78. Additional mixer 78 has connected thereto $f_2(\omega_1)$ from reference signal generator 72. Mixer 78 produces output which is coupled to an additional low pass filter 79 which blocks high frequency error signals and produces a low pass signal band to signal conditioner 81. An output indicative of angular velocity inputs about the Y axis of FIG. 5 is provided by signal conditioner 81. In this fashion both X and Y axis output signals are provided.

Figure 10:
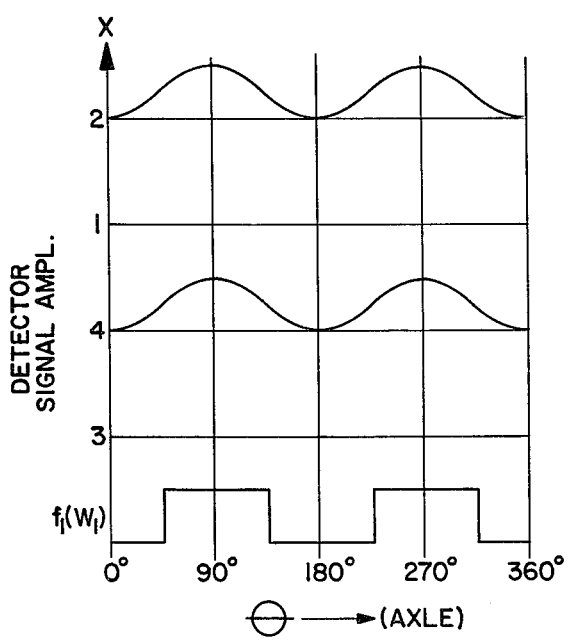
FIG. 10 is a diagram showing signal output for angular velocity input about one sensing axis.
Figure 11:
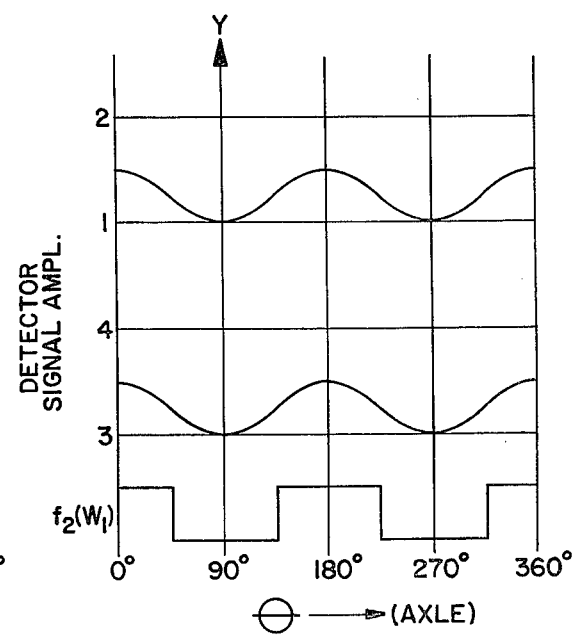
FIG. 11 is a diagram showing signal output for angular velocity input about another sensing axis.

As mentioned above the detected outputs from detectors 73 and 74 are inverted relatively. In like manner the outputs from detectors 63 and 64 are such that one is inverted from the other. FIG. 10 shows outputs from detectors 63 and 64 as a function of axle angle relative to the X axis. The detected outputs from detectors 73 and 74 are shown in FIG. 11 as the axle travels through 360 mechanical degrees. Thus, these two output pairs in FIGS. 10 and 11 are summed in summing networks 69 and 76 respectively in this embodiment to enhance the amplitude of the output signal therefrom. Certain DC errors introduced into the summed signal by DC offset or unbalance in the individual pickoff channels are removed in the high pass filters 71 and 77 and the resulting corrected signal is connected to mixer 66 and 78 respectively.

Figure 8:
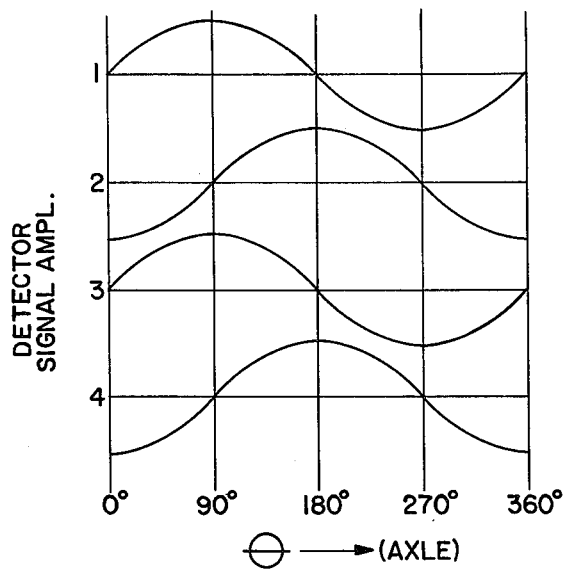
FIG. 8 is a diagram showing one rotor induced pickoff signal error.

It should be noted here that several sources of signal error are present as well as the aforementioned DC source due to the physical construction of the two axis rate sensor. For example the rotor may not be rotating in a plane which is precisely orthogonal to the spin axis Z or precisely parallel with the plane containing pickoff coils 31/32 and 59/61. In such a situation a wobble frequency will appear in the signal at the spin frequency $\omega_1$. This may be seen in FIG. 8 of the drawings where a detected wobble error is seen at the detector outputs having an amplitude which is a function of axle angular position. One cycle occurs for each rotational cycle of the axle. This is a predominant error component and is removed partially by the high pass filters 71 and 77, which pass the signal frequency $2\omega_1$ more readily, and partially by the low pass filters 67 and 79 receiving the mixer outputs as hereinafter described.

Figure 9:
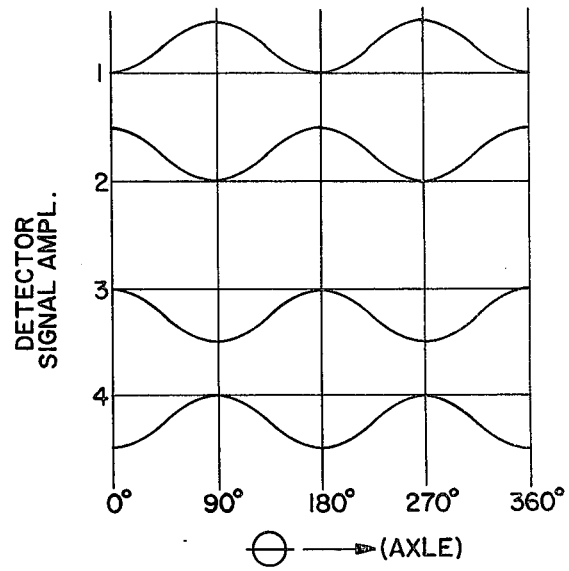
FIG. 9 is a diagram showing another rotor induced pickoff signal error.

Another source of error in the output signals is caused by a "dished" shape of the rotor which will provide an error signal at a frequency which is twice that of the spin frequency, or $2\omega_1$ as seen in FIG. 9. Note that the dished rotor error signals for pickoff coils located on opposite sides of the spin axis are in phase due to the fact that the cupped or dished effect of the rotor 44 decreases and increases the spacing synchronously at the pickoff coils associated with the same channel on opposite sides of the spin axes.

Error signals components are therefore at two times the spin frequency due to the "dished" rotor condition, at the rotor frequency due to rotor wobble, at DC due to certain offset and unbalance errors, and at some higher harmonics of the wobble and dished rotor frequencies. The dished rotor error is eliminated by the inversion technique at one of the detectors in the parallel signal channels for each axis which culminate at the summing networks 69 and 76 for each axis. As mentioned above the DC error signals are removed by the high pass filtering coupling the summed signals from summing networks 69 and 76 to the mixers 66 and 78 respectively. The frequencies present at the outputs of the high pass filters 71 and 77 which are connected to the multipliers are primarily the remaining wobble frequency at the spin frequency $\omega_1$ and the data signal at twice the spin frequency $2\omega_1$ resulting from angular velocity inputs about the X and Y axes.

A multiplier or mixer output contains a sum of two input frequencies and the difference of those two input frequencies. In this embodiment reference signal generator 72 provides output frequencies at twice the spin frequency, or $2\omega_1$, and at predetermined phase relationships which serve as switching signals in the multipliers 66 and 78 and provide the sum and difference frequencies in the output spectrum which is known to be obtained from devices of this type. Since the inputs to the mixers 66 and 78 from the high pass filters 71 and 77 contain primarily $\omega_1$ and $2\omega_1$, and since $f_1(\omega_1)$ and $f_2(\omega_1)$ are at $2\omega_1$ in this embodiment, the mixer output spectrum will contain a data signal at DC, primary noise signals at $\omega_1$ and $3\omega_1$ and additional noise signals at two, four and five times spin frequency with small higher harmonic content.

The sum and difference frequencies appear therefore in a spectrum including the DC data signal. Low pass filters 67 and 79 receive the spectra from mixers 66 and 78 and are provided with about a 30 Hertz band width which substantially eliminates all frequencies at the spin frequency and above which are generally considerably higher than 30 Hertz. Thus, the predominant error frequency $\omega_1$ is treated for the second time and substantially removed by the low pass filters which pass the DC data undisturbed. A bass band width is necessary because of the additional mixing effect at the instrument itself where input angular velocity may have a frequency. The sum and difference frequencies of interest resulting therefrom will be under 30 Hertz. An output is thereby obtained from the low pass filters 67 and 79 which are substantially free of errors due to electrically and mechanically induced noise, and which are subsequently conditioned as desired for presentation as angular velocity output data for angular velocity inputs about the X and Y axes.

The aforementioned predetermined phase relationships in the outputs $f_1(\omega_1)$ and $f_2(\omega_1)$ are seen in FIGS.

10 and 11. Reference signal generator 72 shifts $f_1(\omega_1)$ 90° electrically leading and $f_2(\omega_1)$ 90° electrically lagging. Therefore $f_1(\omega_1)$ is in phase with the sum of the two signals from detectors 63 and 64 in FIG. 10 and $f_2(\omega_1)$ is in phase with the sum of the two signals from detectors 73 and 74 in FIG. 11. Thus proper mixing is obtained in mixers 66 and 78 as the reference signals initiate switching therein.

Figure 12:
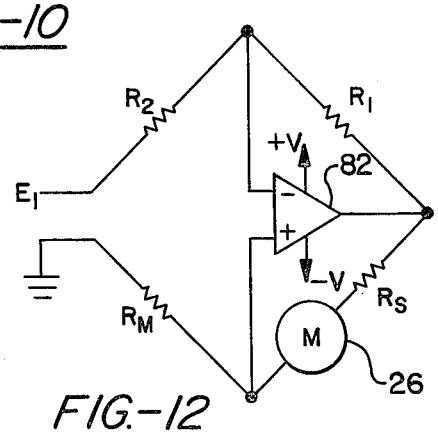
FIG. 12 is a schematic diagram of the motor control circuit.

It is clear from the foregoing that some manner of speed control for angular rotation of shaft 24 is necessary since the signal circuits contain several elements which are frequency sensitive. If the rotor spin speed about the Z axes is low, the low pass filters 67 and 79 have a difficult time separating the spin frequency from the data frequency. If the rotational speed of shaft 24 is high there are potential bearing failure problems in the motor 26. Reference is therefore made to FIG. 12 where one type of circuit for controlling the speed of motor 26 is shown. Alternatively it may be said that the torque provided by motor 26 at shaft 24 is such that the rotational speed of shaft 24 is held substantially constant for varying load applied thereto.

In the instance where motor 26 is a DC motor it is desirable to maintain a constant back EMF at the motor terminals. A constant back EMF is indicative of a constant motor speed. To obtain this end it is desirable to introduce a "negative impedance" in series with the motor impedance for the purpose of cancelling the impedance of motor 26. In this fashion variance in terminal voltage of motor 26 due to load changes will prevent back EMF variation and hold the speed of shaft 24 constant. Positive feedback is one way of obtaining negative resistance. Just enough positive feedback is desirable while preventing the system from going into oscillation. The manner in which the above is accomplished is preceded by measuring the motor characteristics including RPM/Volt, the series resistance of the motor winding, and the terminal voltage of the motor at no load, which is for practical purposes the back EMF of motor 26. A series resistance RS of motor 26 is known and a model resistance RM is chosen when considering how much power can be expended in the model. Generally low power loss is desirable so the model resistance RM is scaled down. The series resistance RS of motor 26 is connected between the output of amplifier 82 and the non-inverting input frequency forming an impedance in a positive feedback path. The ratio of RS to RM provides a reference value for the impedance ratio of R1 to R2. R1 is in the negative feedback path from the output of amplifier 82 to the inverting input thereof and resistance R2 is connected to the inverting input. A negative feedback is thereby provided to amplifier 82 by way of resistance R1, so that the closed loop gain is equivalent to the ratio of the motor series resistance RS to the motor model resistance RM plus one. The plus one is necessary because there is some voltage drop across the model resistance RM due to motor current through it to a reference level as shown in FIG. 12. A motor control voltage E1 is applied to the inverting input terminal of the amplifier 82. With the proper resistance values in the bridge-like circuit of FIG. 12, back EMF will now equal the control voltage E1 times the closed loop gain, which is defined as the zero impedance situation in motor 26.

Two sets of functional resistance values for the circuit of FIG. 12 are set forth below which have been used with an available DC motor representing motor 26.

|  | R2 | R1 | RS | RM | GAIN |
|---|---|---|---|---|---|
| EXAMPLE 1: | 10KΩ | 110KΩ | 100Ω | 10Ω | 11 |
| EXAMPLE 2: | 10KΩ | 100KΩ | 100Ω | 11.11Ω | 10 |

The foregoing values provide just enough positive feedback to avoid oscillation in the system considering the voltage drop through the model resistance RM. The circuit of FIG. 12 samples the current through motor 26 at the non-inverting input of amplifier 82 and illustrates how both positive and negative feedback is utilized to control the rotational speed of motor 26 by controlling the torque at motor shaft 24.

What is claimed is:

1. A two axis gas filled angular velocity sensor, comprising a framework, a rotor mounted within and being free to rotate about a spin axis relative to said framework, a motor mounted within said framework providing a drive torque about said spin axis, a hub coupling said rotor with said drive torque, said rotor having an annular disc shape with a damping face and an opposite pickoff face, means disposed between said rotor and said hub for providing pivoting motion of said rotor about one diameter thereof, a damping plate attached to said hub positioned proximate to and spaced axially from said damping face so that a damping gap is formed therebetween, whereby gas in said damping gap provides damping for said pivoting motion of said rotor, circuit means connected to said motor for controlling said drive torque to provide a constant rotational speed of said rotor, first and second pickoffs mounted in said framework having predetermined angular separation about said spin axis and further being in spaced relation with said pickoff face, said pickoffs providing first and second output signals respectively indicative of spacing between said pickoffs and said pickoff face, whereby angular velocity of said framework about a first and a second axis therethrough provides indication thereof in said first and second output signals respectively, said first and second axes being oriented orthogonally to said spin axis and at said predetermined angular separation.

2. A two axis angular velocity sensor as in claim 1 wherein said hub has an opening therein whereby surrounding gas is pumped through said damping gap by centrifugal force due to rotation of said rotor, so that damping of said rotor pivoting motion is aided.

3. A two axis angular velocity sensor as in claim 1 wherein said means for providing pivoting motion comprises a flat flexure spring section positioned on opposite sides of said hub disposed to bend about said one diameter.

4. A two axis angular velocity sensor as in claim 1 wherein said first and second pickoffs each comprise first and second coils positioned on opposite sides of said spin axis and each providing a signal indicative of spacing from said pickoff face, together with means for detecting and summing signals from said first and second coils providing said first and second output signals, said means for detecting operating to invert one of the signals from said first and second coils, whereby noise components in said first and second coil signals which are generated in phase are cancelled as out of phase components in said means for summing.

5. A two axis angular velocity sensor as in claim 1 wherein said first and second pickoffs each comprise a pair of coils positioned on opposite sides of said spin axis each providing a signal indicative of spacing from said pickoff face, together with means for summing signals from each of said pair of coils providing said first and second output signals, radially extending spokes on said hub, a rotor position pickoff mounted in said framework spaced from said spokes in predetermined angular relation with said first and second pickoffs, said rotor position pickoff providing a rotor position signal, first and second mixers each coupled to receive said first and second output signals respectively and said rotor position signal, each of said mixers providing an output spectrum including a DC difference signal and a high frequency sum signal, and first and second low pass filters coupled to receive said first and second mixer output spectra respectively, and each operating to block said high frequency sum signal and to provide said DC signal as indicative of angular velocity about said first and second axes.

6. A two axis angular velocity sensor as in claim 1 wherein said circuit means for controlling said drive torque comprises a differential amplifier having an inverting input, a non-inverting input, and an output, a first feedback path from said output through a feedback impedance to said inverting input, a second feedback path from said output through said motor impedance to said non-inverting input, an input impedance connected to said inverting input and a model impedance connected to said non-inverting input so that the ratio of feedback to input impedances is proximate to but greater than the ratio of motor to model impedance, whereby motor back EMF is substantially equal to a control voltage applied at said inverting input times the closed loop gain of said differential amplifier.

7. A two axis angular rate sensor, comprising a framework having first and second input axes associated therewith, a motor mounted in said framework, a hub coupled to be driven rotationally about a spin axis by said motor, means connected to said motor for controlling the rotation of said hub to a predetermined angular speed, a rotor having a flat annular disc shape providing a small axial thickness relative to rotor diameter, a damping face and a pickoff face on said rotor, a spring member connected between said rotor and said hub so that said rotor is driven rotationally with said hub and is free to move in spring restrained rotation about one diameter of said rotor, a damping plate mounted on said hub proximate to and spaced from said damping face, whereby surrounding air is urged through said damping gap by said rotor when spinning, a pair of first pickoff coils mounted in said framework substantially in alignment with said first input axis on opposite sides of said spin axis spaced from said pickoff face and providing a first output signal pair, a pair of second pickoff coils mounted as said pair of first pickoff coils and substantially in alignment with said second input axis providing a second output signal pair, first means for detecting and summing said first output signal pair providing a first output indicative of annular rate inputs about said first input axis, and second means for detecting and summing said second output signal pair providing a second output indicative of angular rate inputs about said second input axis.

8. A two axis angular rate sensor as in claim 7 wherein said first and second outputs have noise signal frequencies therein and wherein said hub includes a predetermined number of radial spokes, together with a rotor position pickoff mounted in said framework proximate to and spaced from said radial spokes and providing a rotor position signal having a frequency corresponding to said predetermined number of radial spokes, and first and second mixers receiving said first and second outputs respectively and each receiving said rotor position signal, said rotor position signal operating to switch said first and second outputs thereby providing first and second mixer outputs having a reduced noise signal frequency content.

9. A two axis angular rate sensor as in claim 8 together with first and second low pass filters coupled to receive said first and second mixer outputs and providing first and second filter outputs respectively having further reduced noise signal frequency contents.

10. A two axis angular rate sensor as in claim 7 wherein said means for controlling comprises an amplifier having an inverting input, a non-inverting input and an output, a feedback impedance connected between said output and said inverting input, an input impedance connected to said inverting input, said motor being connected between said output and said non-inverting input, and a model impedance connected to said non-inverting input, said feedback and input impedances having a ratio similar to but greater than the ratio of said motor and model impedances, whereby a control voltage applied to said inverting input provides a motor terminal voltage substantially proportional to motor load whereby motor speed is substantially constant over a range of motor load conditions.

11. A two axis angular rate sensor as in claim 7 wherein said spring member comprises a pair of arcuate sections of flat spring each having one end attached to said hub and the other end attached to said rotor, whereby said arcuate sections are flexed in a bending mode when said rotor moves rotationally about said one diameter.

* * * * *